United States Patent
Amano et al.

(10) Patent No.: US 10,442,132 B1
(45) Date of Patent: Oct. 15, 2019

(54) THREE-DIMENSIONAL PRINTING OF AUXETIC/NON-AUXETIC COMBO OBJECTS

(71) Applicant: Konica Minolta Laboratory U.S.A., Inc., San Mateo, CA (US)

(72) Inventors: Jun Amano, Hillsborough, CA (US); Michael Stopa, San Mateo, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 16/009,972

(22) Filed: Jun. 15, 2018

(51) Int. Cl.
| | | |
|---|---|---|
| B29C 41/22 | (2006.01) |
| B29C 64/118 | (2017.01) |
| B33Y 80/00 | (2015.01) |
| B33Y 10/00 | (2015.01) |
| B29C 64/112 | (2017.01) |

(52) U.S. Cl.
CPC .......... *B29C 64/118* (2017.08); *B29C 64/112* (2017.08); *B33Y 10/00* (2014.12); *B33Y 80/00* (2014.12)

(58) Field of Classification Search
CPC ..... B29C 41/22; B29C 64/106; B29C 64/112; B29C 64/118
USPC ................................................ 264/255, 308
See application file for complete search history.

(56) References Cited

U.S. PATENT DOCUMENTS

| | | | |
|---|---|---|---|
| 2016/0096318 A1* | 4/2016 | Bickel .................. | B29C 64/106 264/40.1 |
| 2016/0318255 A1* | 11/2016 | Ou ........................ | B29C 64/386 |
| 2017/0058985 A1* | 3/2017 | Martino Gonzalez .... | F16F 7/00 |
| 2017/0258178 A1 | 9/2017 | Cross et al. | |
| 2018/0265023 A1* | 9/2018 | Faruque ................ | B33Y 10/00 |

OTHER PUBLICATIONS

Rueger, Z. et al., "Strong Cosserat Elasticity in a Transversely Isotropic Polymer Lattice" Physical Review Letters 120, 065501, University of Wisconsin, dated Feb. 8, 2018 (5 pages).
Reid, Daniel R. et al., "Auxetic metamaterial from disordered networks" dated Jan. 15, 2018 (12 pages).
Fozdar, David Y. et al., "Three-Dimensional Polymer Constructs Exhibiting a Tunable Negative Poisson's Ratio" Advanced Functional Materials, 2011 (9 pages).
Yan, Pengli et al., "3D Printing Hierarchical Silver Nanowire Aerogel with Highly Compressive Resilience and Tensil Elongation through Tunable Poisson's Ratio" Advanced Science News, Small 13, 1701756, 2017 (7 pages).

* cited by examiner

*Primary Examiner* — Leo B Tentoni
(74) *Attorney, Agent, or Firm* — Osha Liang LLP (57) ABSTRACT

A method for manufacturing a three-dimensional printed (3D-printed) object on a base plate. The method includes: depositing at least one block of a first material in a first layer directly onto the base plate; and depositing at least one block of a second material either in the first layer adjacent to the one or more blocks of the first material, or in a second layer directly onto the at least one block of the first material in the first layer. The first material is one of a non-auxetic structure or an auxetic structure, and the second material is the other one of the non-auxetic structure or the auxetic structure.

10 Claims, 10 Drawing Sheets

THREE-DIMENSIONAL PRINTING OF AUXETIC/NON-AUXETIC COMBO OBJECTS

BACKGROUND

Auxetic structures have higher tensile strengths than non-auxetic structures. In addition, auxetic structures can be printed with conventional three-dimensional printing (3D-printing) methods.

SUMMARY

In general, in one aspect, the invention relates to a method for manufacturing a three-dimensional printed (3D-printed) object on a base plate. The method includes: depositing at least one block of a first material in a first layer directly onto the base plate; and depositing at least one block of a second material either in the first layer adjacent to the one or more blocks of the first material, or in a second layer directly onto the at least one block of the first material in the first layer. In the method, the first material is one of a non-auxetic structure or an auxetic structure, and the second material is the other one of the non-auxetic structure or the auxetic structure.

In general, in one aspect, the invention relates to a three-dimensional printed (3D-printed) object. The 3D-printed object includes: at least one block of a first material in a first layer of the 3D-printed object; and at least one block of a second material either in the first layer adjacent to the one or more blocks of the first material, or in a second layer of the 3D-printed object directly disposed on the at least one block of the first material in the first layer. In the 3D-printed object, the first material is one of a non-auxetic structure or an auxetic structure, and the second material is the other one of the non-auxetic structure or the auxetic structure.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1A:
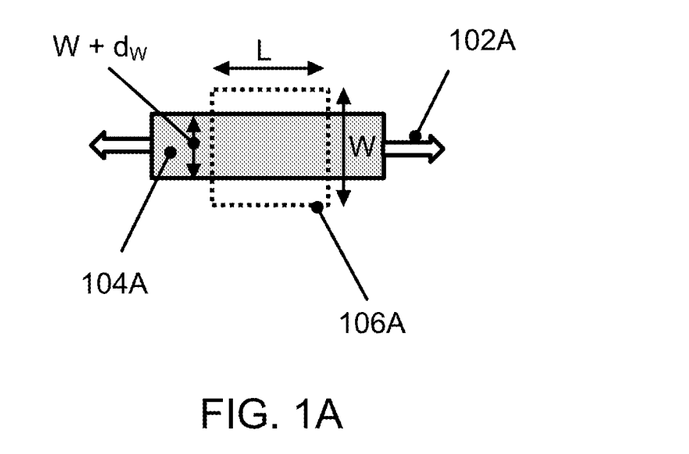
FIGS. 1A-1B show an example of tensile behavior of non-auxetic and auxetic structures, respectively.
Figure 1B:
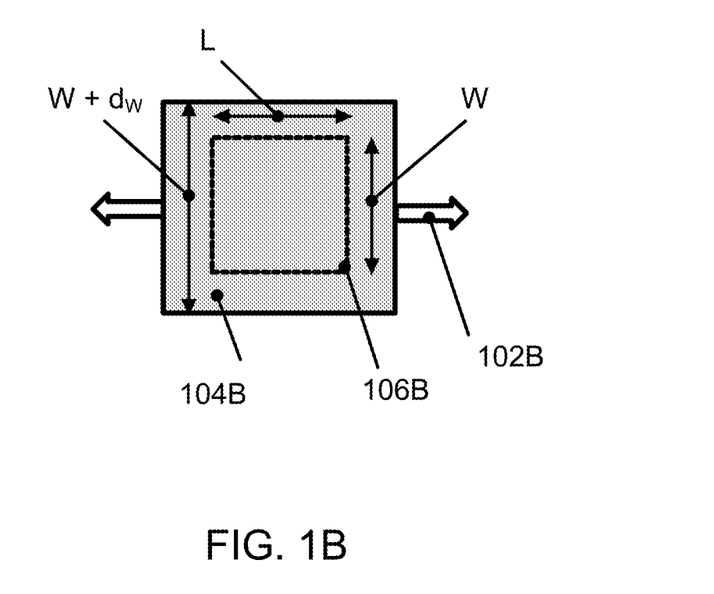

When tensile force (i.e., tension) is applied to a structure, a length of that structure increases in dimensions along a direction of the tensile force and the structure deforms in dimensions along a direction perpendicular to the tensile force. Referring to FIGS. 1A-1B as an example, for a structure with length L and width W, when the tensile force (102A, 102B) is applied across the length L of the structure, the length L and the width W change by specific amounts $d_L$ and $d_W$, respectively.

A strain (e) along a dimension of the structure can be defined as a ratio of the amount of change from the initial size and the initial size of the structure's dimensions. For example, longitudinal strains (i.e., strains along the direction of the tensile force) and transverse strains (i.e., strains along the direction perpendicular to the tensile force) can be measured as $d_L/L$ and $d_W/W$, respectively.

In the above example, while the length L of the structure increases (i.e., positive $d_L$) due to the tension, the width W may decrease (i.e., negative $d_W$) or increase (i.e., positive $d_W$) depending on whether the structure is non-auxetic or auxetic. FIG. 1A shows an example of a non-auxetic structure where the original width W of the structure (106A) is larger than a width W+dw of the stretched structure (104A) (i.e., the original width has decreased). On the other hand, FIG. 1B shows an example of an auxetic structure where the original width W of the structure (106B) is smaller than the width W+dw of the stretched structure (104B) (i.e., the original width has increased). Structures that show a decrease and an increase in their width as illustrated in FIG. 1A and FIG. 1B are known as non-auxetic and auxetic structures, respectively.

Auxeticness is ability to expand perpendicularly in response to an application of tensile force. The auxeticness of a structure can be quantified using a Poisson ratio. The Poisson ratio is equal to $[-e_W/e_L]$, where $e_W$ and $e_L$ are the transverse and longitudinal strains, respectively. Because auxetic structures have a positive transverse strain (due to a positive $d_W$ as the structure expands laterally), the Poisson ratio of the auxetic structures is negative. In contrast, because non-auxetic structures have a negative transverse strain (due to a negative $d_W$ as the structure shrinks laterally) the Poisson ratio of non-auxetic structures is positive.

Because of the properties of auxetic structures, auxetic structures can tolerate a higher tensile force than non-auxetic structures. One reason is that, under tension, auxetic structures become thicker laterally, while non-auxetic structures do not. Therefore, auxetic structures have higher tensile strength (i.e., tolerance to tearing under tension) as compared to non-auxetic structures. In addition, auxetic structures have better stress tolerance under localized force because auxetic structures better distribute the force throughout the entire structure.

Figure 2:
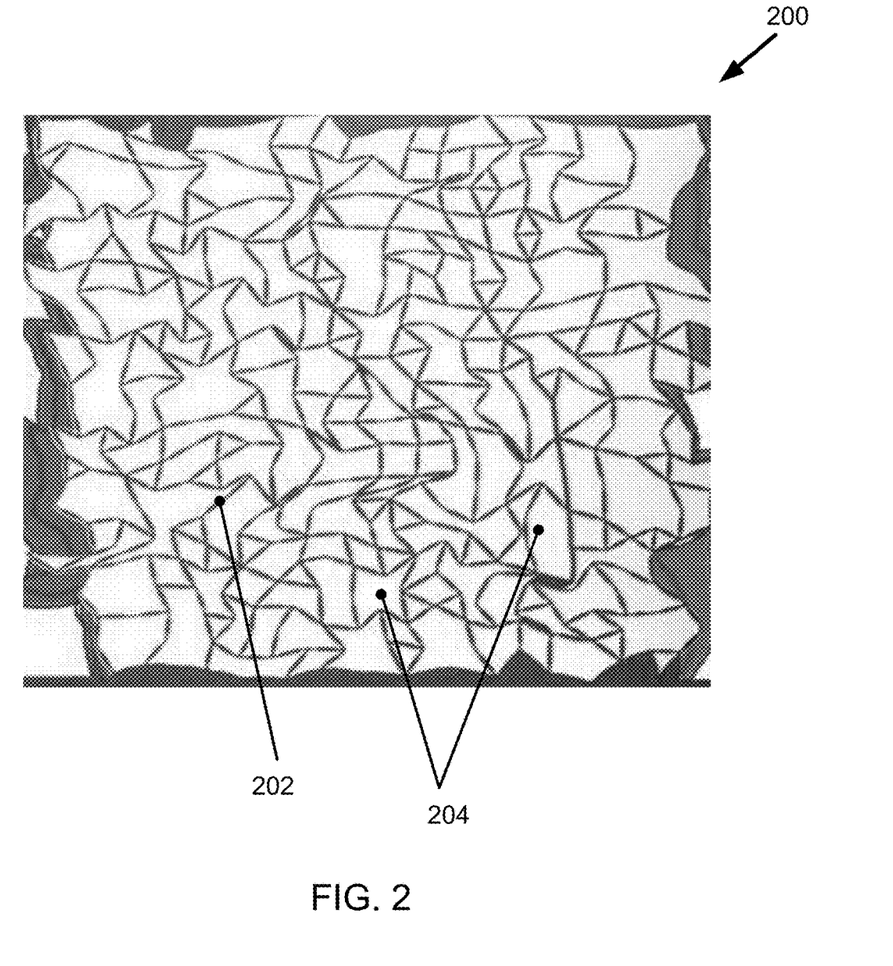
FIG. 2 shows an example of an auxetic structure with a disordered network.

Auxetic structures may have various configurations that have a negative Poisson ratio. For example, an auxetic structure may include a disordered network (i.e., a disordered auxetic structure) as shown in FIG. 2. FIG. 2 shows a cross-sectional view of an auxetic structure formed by a disordered network of layers of a material (202) that make-up many non-uniform empty spaces (204). In one or more embodiments of the invention, the disordered auxetic structure can be designed through computer simulations to obtain a desired negative Poisson ratio.

Additionally, auxetic structures may also include a uniform network (i.e., a uniform auxetic structure). Cosserat elastic structures are examples of uniform auxetic structures. Cosserat elastic structures' networks are formed by nodes (i.e., points within the structure that are connected with arms to form a network) that are rotatable with respect to one another and can mechanically couple with other nodes in the network. Unlike classical elastic materials, which have only two different elastic constants, Cosserat elastic structures have six different elastic constants where stress is related to motion (translation and rotation). Because of the extra number of elastic constants, the nodes in Cosserat elastic structures rotate locally with a higher degree of freedom than the nodes that can be found in the classical elastic material (e.g., non-auxetic structures). Because of the localized rotations, Cosserat elastic structures are able to better distribute a force in their networks. This leads to lower localized stress in Cosserat elastic structures.

Figure 3:
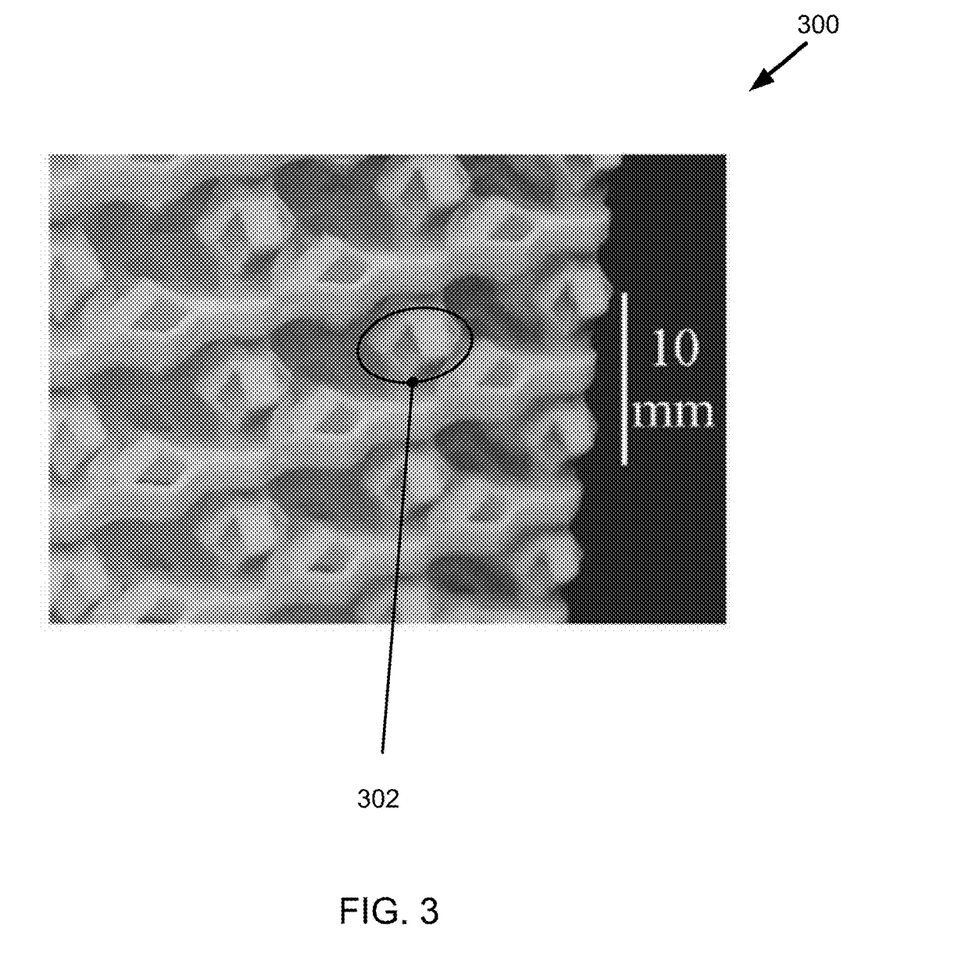
FIG. 3 shows an example of an auxetic structure with a Cosserat network.

FIG. 3 shows an example of a Cosserat elastic structure (300) with nodes (302) in the Cosserat elastic structure's network. The nodes (302) enable translation, rotation, and coupling between other areas in the Cosserat elastic structure's network.

In general, embodiments of the invention provide a method, a non-transitory computer readable medium (CRM), and a system for the 3D-printing of a 3D-printed object that includes a combination of the auxetic and non-auxetic structures. Specifically, for the 3D-printing of the 3D-printed object, a 3D-printing material is deposited on a surface to form a plurality of blocks that are connected to form the 3D-printed object. Each block is one of an auxetic or a non-auxetic structure (i.e., an auxetic block and a non-auxetic block, respectively). Hereinafter, the 3D-printed object that includes a combination of the auxetic and the non-auxetic blocks is called a "combined (combo) 3D-printed object." In one or more embodiments, a block may be a piece of material (auxetic or non-auxetic) of any size and any shape. In one or more embodiments, a block may be a 3D-printed structure that has a uniform network, a structure with a disordered network, etc.

In one or more embodiments of the invention, a non-auxetic block is formed by depositing threads (i.e., wire-shaped lines of a material extruded from a printing nozzle of printing head of a 3D-printer and deposited onto a surface) of a material next to each other to form a solid piece of non-auxetic material.

In one or more embodiments, the material may be selected from various polymers including Acrylonitrile Butadiene Styrene (ABS), Polylactic Acid (PLA), Polyethylene Terephthalate (PETT), Nylon/Polyamide, High Impact Polystyrene (HIPS), High Density Polyethylene (HDPE), Polyether Ether Ketone (PEEK), Polyethylene Terephthalate (PET), Polypropylene (PP), Polyvinyl Alcohol (PVA), Polycarbonate (PC), and Polyolefin, etc.

In one or more embodiments, the material may be selected from various polymer composites with various filler materials including talc, cellulose nanofiber, clay, glass fiber, carbon fiber, carbon nanotube (CNT), etc.

In one or more embodiments of the invention, the auxetic or non-auxetic blocks may be deposited to form one or more layers of the combo 3D-printed object. The layers of the combo 3D-printed object are stacked on each other in a direction (i.e., vertical direction) of the combo 3D-printed object. In one or more embodiments, an auxetic or non-auxetic block may form an entirety of a layer of the combo 3D-printed object. In one or more embodiments, an auxetic or non-auxetic block may form only part of a layer of the combo 3D-printed object and form the entirety of the layer in combination with other auxetic or non-auxetic blocks.

In one or more embodiments of the invention, the vertical direction may be a direction along an extrusion direction of the material from the printing head. The vertical direction may also be in any other direction in view of how the layers of the combo 3D-printed object are identified or deposited.

In one or more embodiments of the invention, each layer may include only one of the auxetic block or non-auxetic block. In one or more embodiments, each layer may be made-up of a plurality of the auxetic or non-auxetic blocks that are connected to one another.

In one or more embodiments of the invention, interfaces in the vertical direction (i.e., vertical interfaces) are formed between an auxetic block and an adjacent non-auxetic block within a layer of the combo 3D-printed object. In one or more embodiments, each of one or more layers may have a plurality of the vertical interfaces. The combo 3D-printed object also includes inter-layer interfaces (i.e., an interface between two adjacent layers where the layers come into direct contact).

In one or more embodiments of the invention, the tensile strength of the combo 3D-printed object in the vertical direction is adjustable by adjusting a ratio between a sum of the thicknesses (i.e., width of a block along the vertical direction) of the auxetic blocks and a sum of the thicknesses of the non-auxetic blocks.

In one or more embodiments of the invention, the combo 3D-printed object has higher tensile strength along the vertical direction of the combo 3D-printed object and is lighter compared to a regular 3D-printed object of a same size and shape made-up of only non-auxetic blocks.

In one or more embodiments of the invention, the combo 3D-printed object has a smaller volume compared to a regular 3D-printed object of a same size and shape of the combo 3D-printed object made-up of only auxetic blocks.

Auxetic blocks that have a Cosserat elastic network (i.e., Cosserat elastic blocks with Cosserat elastic structures) may provide more rigidity than auxetic blocks that have a disordered network (i.e., disordered auxetic blocks). In one or more embodiments of the invention, depending on a desired rigidity, auxetic blocks may be designed to be either Cosserat elastic blocks or disordered auxetic blocks.

Below, one or more embodiments of the invention will be described by reference to FIGS. 4-10.

Figure 4:
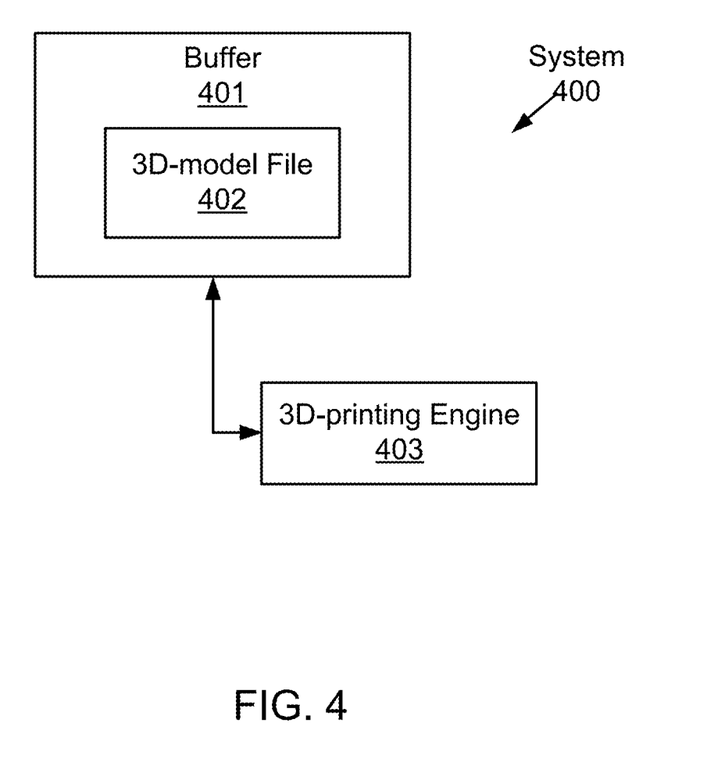
FIG. 4 shows a system in accordance with one or more embodiments of the invention.

FIG. 4 shows a system (400) for 3D-printing of the combo 3D-printed object in accordance with one or more embodiments of the invention. As shown in FIG. 4, the system (400) has multiple components, including, for example, a buffer (401) and a 3D-printing engine (403). Each of these components (401, 403) may be located on the same computing device (e.g., personal computer (PC), laptop, tablet PC, smart phone, multifunction printer, kiosk, server, etc.) or on different computing devices connected by a network of any size having wired and/or wireless segments.

In one or more embodiments of the invention, the buffer (401) may be implemented in hardware (i.e., circuitry), software, or any combination thereof. The system (400) obtains a 3D-model file (402) of the combo 3D-printed object, and the buffer (401) is configured to store the 3D-model file (402). The 3D-model file (402) may be an image and/or a graphic (e.g., a stereolithogrpahy (STL)

format, a virtual reality model language (VRML) format file, an additive manufacturing file (AMF) format, etc.). The 3D-model file (402) may be obtained (e.g., downloaded, created locally, etc.) from any source.

In one or more embodiments of the invention, the 3D-printing engine (403) may be implemented in hardware (i.e., circuitry), software, or any combination thereof. The 3D-printing engine (403) executes the 3D-model file (402) to print the combo 3D-printed object. This is exemplified in more detail below with reference to FIGS. 5-9.

Although the system (400) is shown as having two components (401, 403), in other embodiments of the invention, the system (400) may have more or fewer components. Further, the functionality of each component described above may be split across components. Further still, each component (401, 403) may be utilized multiple times to carry out an iterative operation.

Figure 5:
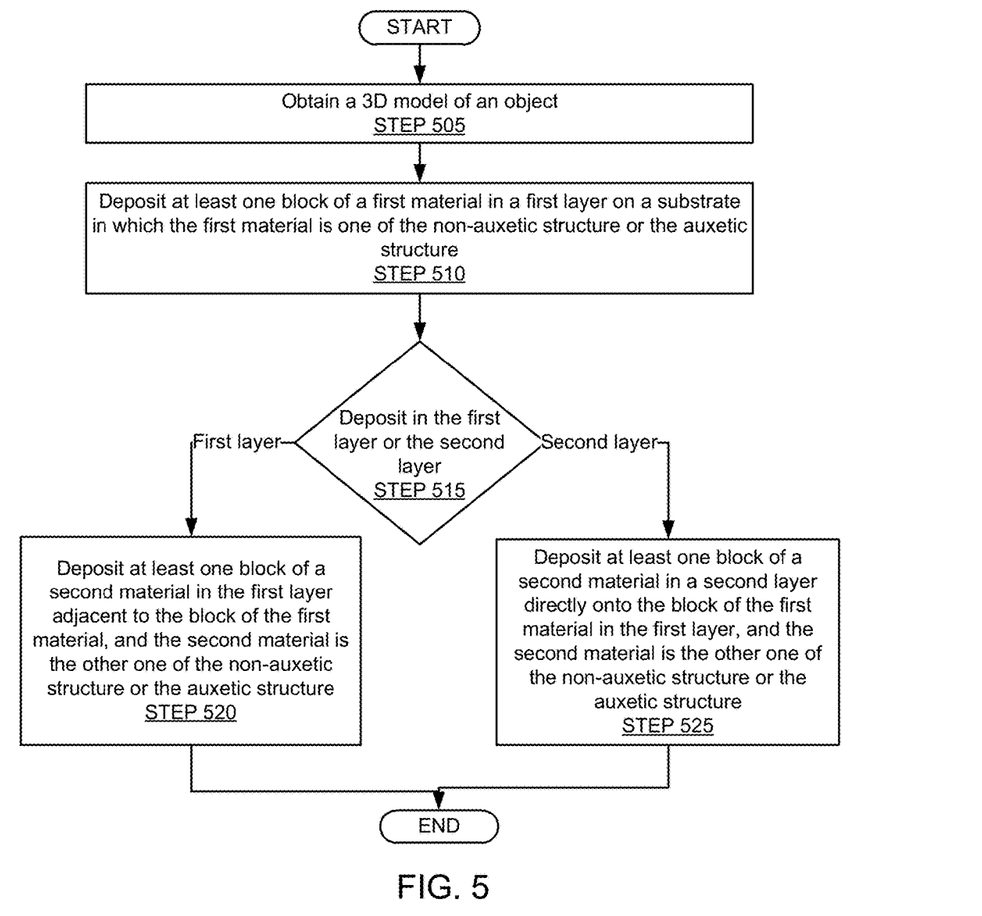
FIG. 5 shows a flowchart in accordance with one or more embodiments of the invention.

FIG. 5 shows a flowchart in accordance with one or more embodiments of the invention. The flowchart depicts a process for manufacturing a combo 3D-printed object described above. One or more of the steps in FIG. 5 may be performed by the components of the system (400), discussed above in reference to FIG. 4. Specifically, one or more steps in FIG. 5 may be performed by the 3D-printing engine (403) as discussed above in reference to FIG. 4. In one or more embodiments of the invention, one or more of the steps shown in FIG. 5 may be omitted, repeated, and/or performed in a different order than the order shown in FIG. 5. Accordingly, the scope of the invention should not be considered limited to the specific arrangement of steps shown in FIG. 5.

Referring to FIG. 5, initially, a 3D-model file of a combo 3D-printed object is obtained and stored (STEP 505). For example, the system (400) may obtain the 3D-model file (402) and store it in the buffer (401). In one or more embodiments, the 3D-model file may include a 3D-schematic of the combo 3D-printed object, print instructions, or any other parameters that are needed for 3D-printing.

In STEP 510, at least one block of a first material, which is one of the non-auxetic structure or the auxetic structure, is deposited in a first layer on a base plate. For example, in one or more embodiments, the 3D-printing engine (403) may be coupled to a printing head that can deposit the 3D-printing material on the base plate.

In one or more embodiments, the block/blocks of the first material may be deposited directly onto the base plate. In one or more embodiments, the block/blocks of the first material may be deposited on another layer that is between the base plate and the first layer.

In STEP 515, it is decided whether to deposit in the first layer or deposit in a second layer, which is directly on the first layer. For example, in one or more embodiments, depending on the instructions provided to the 3D-printing engine (403), the 3D-printing engine (403) may continue its printing job in the first layer or in the second layer. These instructions may be provided by a processor to the 3D-printing engine (403), and may depend on the 3D model of the 3D-printed object.

If it is decided to deposit in the first layer, in STEP 520, at least one block of a second material is deposited in the first layer, and adjacent to the block/blocks of the first material. The second material is the other one of the non-auxetic structure or the auxetic structure related to the first material.

In one or more embodiments, if it is decided to deposit in the second layer, In STEP 525, at least one block of the second material is deposited in the second layer, and directly onto the block/blocks of the first material of the first layer.

For simplicity, hereinafter, it is assumed that the first material is an auxetic structure and the second material is a non-auxetic structure. Consistently, hereinafter, a block of a first material is an auxetic block and a block of the second material is a non-auxetic block. However, it is apparent to one of ordinary skill in the art that the first material can be a non-auxetic structure and the second material can be an auxetic structure. Consistently, it is apparent to one of ordinary skill in the art that a block of a first material can be a non-auxetic block and a block of the second material can be an auxetic block.

In one or more embodiments of the invention, STEPS 510-525 may occur consecutively to deposit a plurality of the auxetic blocks and the non-auxetic blocks in the first layer or the second layer.

In an example in accordance with one or more embodiments, a plurality of the auxetic blocks and a plurality of the non-auxetic blocks may be deposited in the first layer directly on the base plate.

In an example in accordance with one or more embodiments, a plurality of the auxetic blocks are deposited in the second layer directly onto respective blocks of the plurality of non-auxetic blocks of the first layer. In one or more embodiments, a plurality of the non-auxetic blocks are deposited in the second layer directly onto respective blocks of the plurality of auxetic blocks in the first layer.

In one or more embodiments of the invention, STEPS 510-525 may occur consecutively to deposit a plurality of other layers (i.e., successive layers) on top of each other that each may have a plurality of vertical interfaces.

In one or more embodiments, STEPS 510-525 may occur so that within at least one of the layers, one or more of the auxetic blocks form vertical interfaces with adjacent non-auxetic block/blocks.

In one or more embodiments of the invention, one or more vertical interfaces of a layer may not overlap with vertical interfaces in the layers that are adjacent to the layer. For example, one or more vertical interfaces of one of the layers may not overlap with vertical interfaces of a layer directly underneath or above (and in contact) that layer. In one or more embodiments, some vertical interfaces of a layer may overlap with the vertical interfaces of the adjacent layers as a result of design and/or performance constraints.

In one or more embodiments of the invention, none of the vertical interfaces of at least a layer overlap with vertical interfaces in the layers that are adjacent to that layer.

In one or more embodiments, STEPS 510-525 may occur continuously and in way that the STEPS deposit a number of the auxetic blocks or the non-auxetic blocks in a layer that is fewer than a number of the auxetic blocks or the non-auxetic blocks, respectively, in the adjacent underneath layer.

In one or more embodiments, STEPS 505-525 may occur in a way that within a layer, sizes of the auxetic blocks or the non-auxetic blocks may vary.

In one or more embodiments, within a layer, the auxetic blocks may have a same size. In one or more embodiments, within a layer, the non-auxetic blocks may have a same size. In one or more embodiments, within a layer, all of the auxetic blocks and non-auxetic blocks may have a same size.

In one or more embodiments, STEPS 505-525 may occur in a way that a layer (that includes one or more of the auxetic and non-auxetic blocks) may have a different thickness (size of the layer along the vertical direction) than an adjacent layer to that layer.

In one or more embodiments, STEPS 505-525 may occur in a way that within a layer, the thickness of an auxetic block may gradually change. In one or more embodiments, in one or more embodiments, within a layer, the thickness of a non-auxetic block may gradually change.

In one or more embodiments of the invention, STEPS 505-525 of FIG. 5 may be executed by a 3D-printer that may be coupled to the system (400). In one or more embodiments, the 3D-printing engine (403) may cause the 3D-printer to execute the process described in STEPS 510-525.

In one or more embodiments of the invention, after completion of 3D printing of the 3D-printed object, the 3D-printed object is removed from the base plate for post-printing process, such as cleaning and surface smoothing, etc.

FIGS. 6-9 show implementation examples in accordance with one or more embodiments of the invention. The exemplified 3D-printing method described above in reference to FIGS. 4-5 is applied in these implementation examples shown in FIGS. 6-9.

Figure 6:
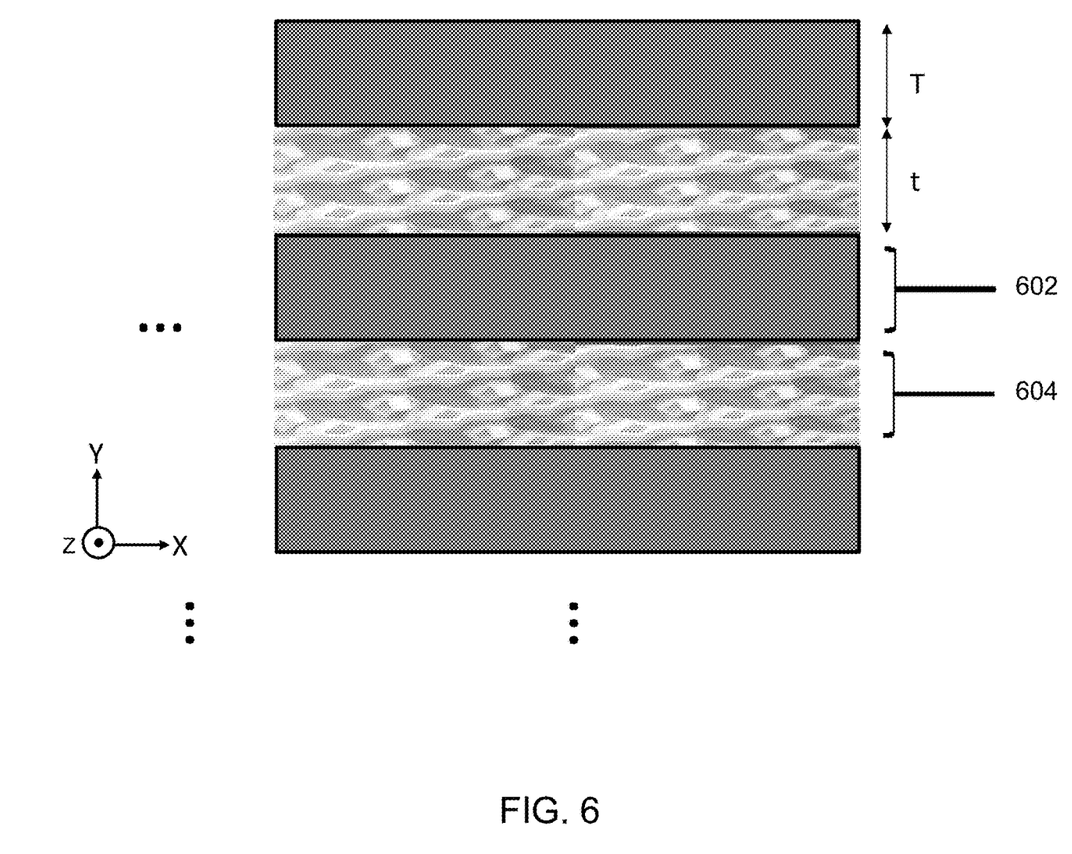
FIG. 6 shows an implementation example in accordance with one or more embodiments of the invention.

FIG. 6 shows a portion of the combo 3D-printed object in which auxetic blocks (604) and non-auxetic blocks (602) are deposited to form a stack that alternates between the auxetic and non-auxetic blocks along the Y axis (i.e., a vertical direction of the combo 3D-printed object). Each of the blocks (602, 604) may extend in any of the X axis or Z axis throughout the blocks' respective layers of the combo 3D-printed object. In one or more embodiments, each auxetic block (604) or non-auxetic block (602) shown in FIG. 6 may be an auxetic or a non-auxetic layer, respectively.

In one or more embodiments of the invention, the thicknesses of the auxetic blocks (t) and the thicknesses of the non-auxetic blocks (T) may be adjusted to obtain a desired tensile strength. In one or more embodiments, the value of t or T may vary between the blocks. In one or more embodiments of the invention, either the auxetic blocks (604) or the non-auxetic blocks (602) may have a same thickness throughout the combo 3D-printed object.

Figure 7:
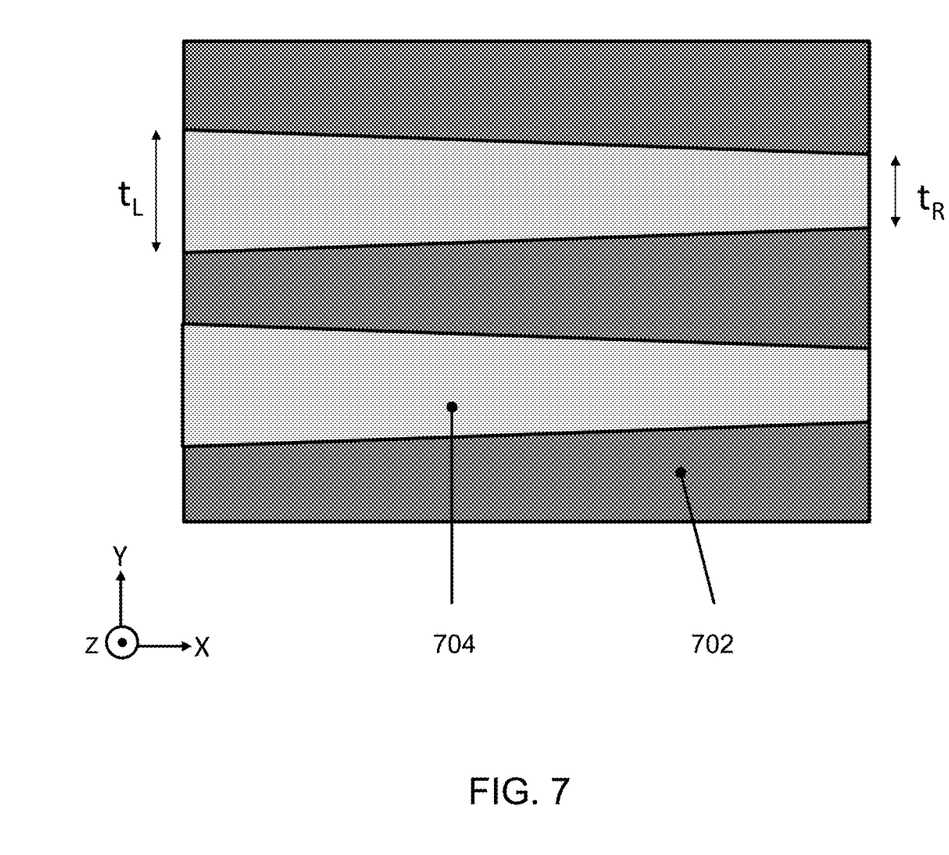
FIG. 7 shows an implementation example in accordance with one or more embodiments of the invention.

FIG. 7 shows a portion of the combo 3D-printed object where block thicknesses may change within the non-auxetic blocks (702) and the auxetic blocks (704). The thickness change may be smooth, linear, etc. as a result of design and/or performance constraints.

For example, FIG. 7 shows that the thicknesses of the auxetic blocks (704) linearly decrease from $t_L$ to $t_R$. The thickness of the auxetic blocks (704) may change with non-linear relations (i.e., having second or higher order relations) with respect to distance in a direction (e.g., X axis in view of FIG. 7).

In one or more embodiments of the invention, the thickness change may provide various tensile strengths across the thickness changing direction (e.g., X axis in view of FIG. 7) (i.e., the tensile strength of the combo 3D-printed object may change with the thickness of the auxetic blocks (704)).

Figure 8:
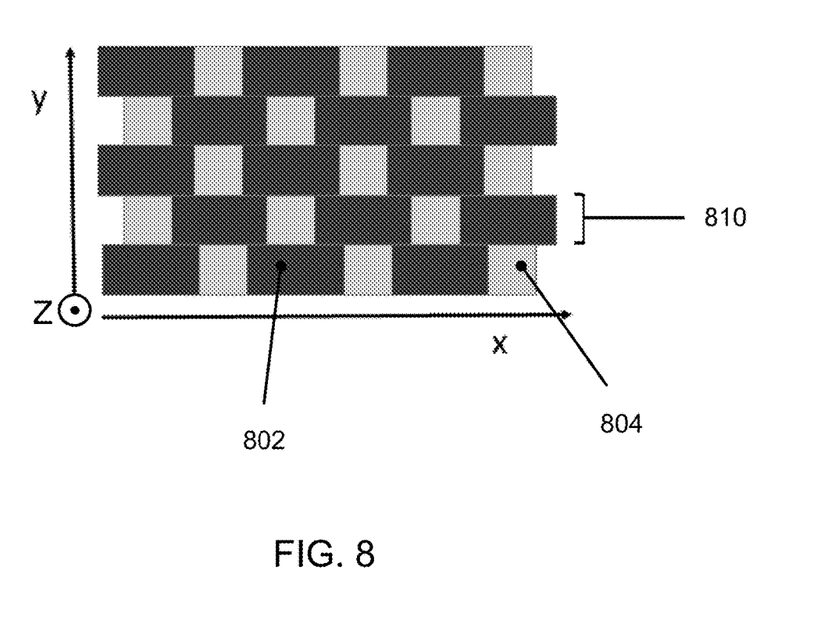
FIG. 8 shows an implementation example in accordance with one or more embodiments of the invention.

FIG. 8 shows a portion of the combo 3D-printed object where a plurality of alternating auxetic blocks (804) and non-auxetic blocks (802) are deposited to form each layer (810). This results in a combo 3D-printing material with a checker-board shape design formed by the auxetic blocks (804) and the non-auxetic blocks (802). As shown in FIG. 8, the vertical interfaces within each layer (810) do not overlap with the vertical interfaces of adjacent layers (810). In one or more embodiments of the invention, the vertical interfaces within one or more layers (810) may be periodic within each of the layers (810). In one or more embodiments, one or more layers (810) may have non-periodic vertical interfaces.

In one or more embodiments of the invention, the auxetic blocks (804) and the non-auxetic blocks (802) in each of the layers (810), may extend throughout the entire layer (810) in a direction perpendicular to the vertical direction. In one or more embodiments, the auxetic blocks (804) and the non-auxetic blocks (802) in each of the layers (810), may extend throughout a part of the layer (810) in the perpendicular direction. For example, In FIG. 8, the auxetic blocks (804) and the non-auxetic blocks (802) in each of the layers (810), may extend throughout the entire or a part of the layer (810) along the Z axis. By way of this example, the vertical direction is along the Y axis.

Figure 9:
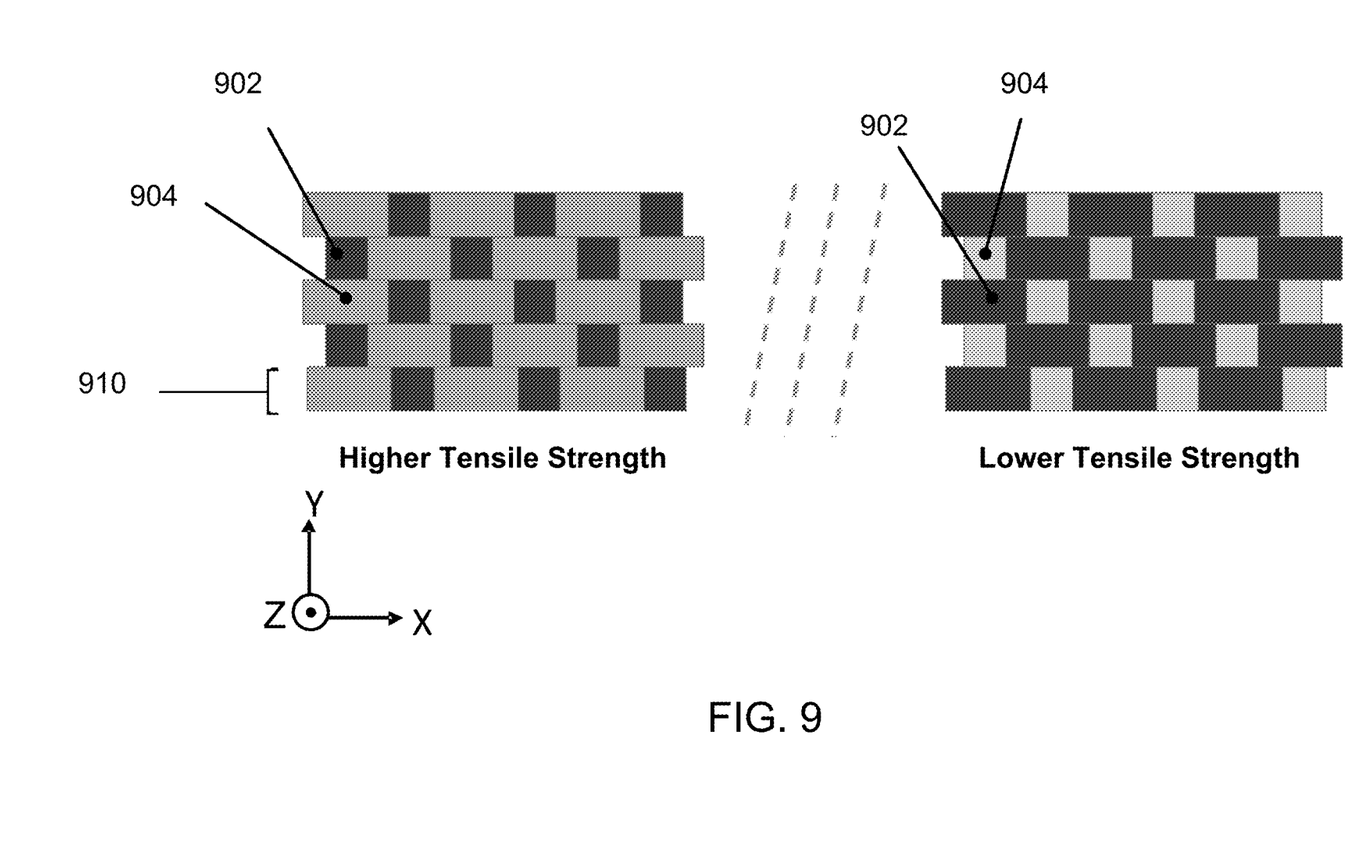
FIG. 9 shows an implementation example in accordance with one or more embodiments of the invention.

Referring to FIG. 9, the tensile strength of the combo 3D-printed object increases when a ratio between the sizes of the auxetic blocks (904) to the non-auxetic blocks (902) (i.e., the block size ratio) increases.

To change the tensile strength across the combo 3D-printed object, the block size ratio may be changed across the combo 3D-printed object. For example, as shown in FIG. 9, within each of the layers (910), the block size ratio is increased from right to left along the X axis. Therefore, the tensile strength of the combo 3D-printed object in FIG. 9 increases in the same direction (i.e., the section of the combo 3D-printed object shown in FIG. 9 (on the left) has a higher tensile strength compared to the section of the combo 3D-printed object shown in FIG. 8).

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

Figure 10:
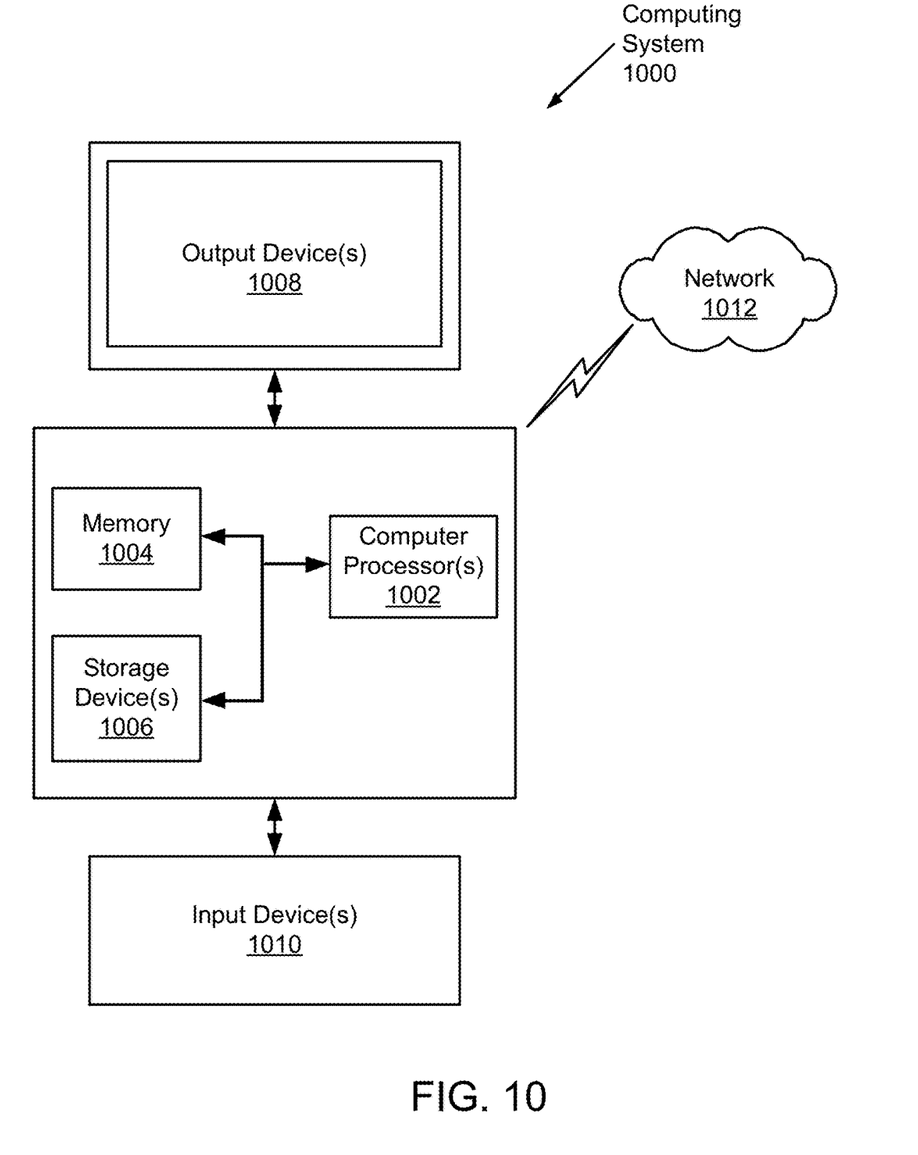
FIG. 10 shows a computing system in accordance with one or more embodiments of the invention.

As shown by way of example in FIG. 10, a computing system (1000) may include one or more computer processor(s) (1002), associated memory (1004) (e.g., random access memory (RAM), cache memory, flash memory, etc.), one or more storage device(s) (1006) (e.g., a hard disk, an optical drive such as a compact disk (CD) drive or digital versatile disk (DVD) drive, a flash memory stick, etc.), and numerous other elements and functionalities. The computer processor(s) (1002) may be an integrated circuit for processing instructions. For example, the computer processor(s) may be one or more cores, or micro-cores of a processor. The computing system (1000) may also include one or more input device(s) (1010), such as a touchscreen, keyboard, mouse, microphone, touchpad, electronic pen, or any other type of input device. Further, the computing system (1000) may include one or more output device(s) (1008), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s).

The computing system (1000) may be connected to a network (1012) (e.g., a local area network (LAN), a wide area network (WAN) such as the Internet, mobile network, or any other type of network) via a network interface connection (not shown). The input and output device(s) may be locally or remotely (e.g., via the network (1012)) connected to the computer processor(s) (1002), memory (1004), and storage device(s) (1006). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (1000) may be located at a remote location and be connected to the other elements over a network (1012). Further, one or more embodiments of the invention may be implemented on a distributed system having a plurality of nodes, where each portion of the invention may be located on a different node within the distributed system. In one embodiment of the invention, the node corresponds to a distinct computing device. In one or more embodiments, the node may correspond to a computer processor with associated physical memory. In one or more embodiments, the node may correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for manufacturing a three-dimensional printed (3D-printed) object on a base plate, the method comprising:
   depositing at least one block of a first material in a first layer directly onto the base plate;
   depositing at least one block of a second material either:
      in the first layer adjacent to the one or more blocks of the first material, or
      in a second layer directly onto the at least one block of the first material in the first layer;
   depositing at least one block of the second material in the first layer adjacent to the block of the first material; and
   depositing in the second layer either:
      at least one block of the first material directly onto the block of the second material in the first layer, or
      at least one block of the second material directly onto the block of the first material in the first layer,
   wherein the first material is one of a non-auxetic structure or an auxetic structure, and the second material is the other one of the non-auxetic structure or the auxetic structure.

2. The method of claim 1, further comprising:
   depositing a plurality of blocks of the first material and a plurality of blocks of the second material in the first layer directly on the base plate;
   depositing a plurality of blocks of the first material in the second layer directly onto respective blocks of the plurality of blocks of the second material in the first layer; and
   depositing a plurality of blocks of the second material in the second layer directly onto respective blocks of the plurality of blocks of the first material in the first layer.

3. The method of claim 2, further comprising:
   depositing a plurality of blocks of the first material and a plurality of blocks of the second material in a plurality of successive layers,
   wherein within each of the successive layers, each block of the first material is adjacent to a respective block of the second material,
   wherein each of the blocks of the first material in each of the successive layers is deposited directly onto a respective block of the second material in the previous layer, and
   wherein each of the blocks of the second material in the each of the successive layers is deposited directly onto a respective block of the first material in the previous layer.

4. The method of claim 3, further comprising:
   depositing a number of blocks of the first material in at least one successive layer that is fewer than a number of blocks of the second material deposited in the previous layer; and
   depositing a number of blocks of the second material in at least one successive layer that is fewer than a number of blocks of the first material deposited in the previous layer.

5. The method of claim 3, further comprising:
   depositing at least one block of the first material in at least one successive layer that has a size different than a size of a respective block of the second material deposited in the previous layer.

6. The method of claim 3, further comprising:
   depositing at least one block of the first material in at least one successive layer that has a thickness different than a thickness of a respective block of the second material deposited in the previous layer.

7. The method of claim 3, further comprising:
   depositing at least one block of the first material in at least one successive layer that has a size different than a size of an adjacent block of the second material deposited in the same layer.

8. The method of claim 3, further comprising:
   removing the 3D printed structure from the base plate for post-printing processes on the 3D printed object.

9. The method of claim 1, wherein the first layer or the second layer is entirely deposited with the first material or the second material.

10. The method of claim 3, wherein
   a plurality of the blocks of the first material and a plurality of the blocks of the second material in at least one successive layer create vertical interfaces between the blocks of the first material in the successive layer and respective adjacent blocks of the second material in the successive layer,
   a plurality of the blocks of the first material and a plurality of the blocks of the second material in the previous layer to the successive layer create vertical interfaces between the blocks of the first material in the previous layer and respective adjacent blocks of the second material in the previous layer,
   wherein one or more of the vertical interfaces in the one successive layer do not overlap with the vertical interfaces of the previous layer.

* * * * *